US012203323B1

(12) United States Patent
Largey

(10) Patent No.: US 12,203,323 B1
(45) Date of Patent: Jan. 21, 2025

(54) SUPPORT STRUCTURE FOR FLOOD BARRIER PANELS

(71) Applicant: Flood Risk America, Inc., Lake Worth, FL (US)

(72) Inventor: Tiffany Largey, Lake Worth, FL (US)

(73) Assignee: FLOOD RISK AMERICA, INC., Lake Worth, FL (US)

( * ) Notice: Subject to any disclaimer, the term of this patent is extended or adjusted under 35 U.S.C. 154(b) by 0 days.

(21) Appl. No.: 18/794,663

(22) Filed: Aug. 5, 2024

(51) Int. Cl.
*E06B 9/00* (2006.01)

(52) U.S. Cl.
CPC .......... *E06B 9/00* (2013.01); *E06B 2009/007* (2013.01)

(58) Field of Classification Search
CPC ................. E06B 9/00; E06B 2009/005; E06B 2009/007; E06B 9/02; E02B 3/10; E02B 3/102; E02B 7/22; E02B 7/54; E02B 3/106; E04H 9/145; E04H 17/161; E04H 17/24
USPC ......... 52/202, 203; 265/5, 6, 9, 13.1, 26, 42, 265/45; 405/107, 114, 115, 116
See application file for complete search history.

(56) References Cited

U.S. PATENT DOCUMENTS 6,042,301 A * 3/2000 Sovran .................... E04H 9/145 405/114
6,450,733 B1 * 9/2002 Krill ......................... E02B 7/22 405/114
7,364,385 B1 * 4/2008 Luke ....................... E02B 3/102 405/114
9,885,162 B1 * 2/2018 Munz ...................... E02B 3/102
2006/0151770 A1 * 7/2006 Payne ................... E04H 17/161 256/45
2008/0245009 A1 * 10/2008 Temple ..................... E04B 1/94 52/317
2014/0369760 A1 * 12/2014 Venton ...................... E02B 7/22 405/114
2015/0204040 A1 * 7/2015 Knezevich ................ E02B 7/54 405/114
2017/0218586 A1 * 8/2017 Knezevich ................ E02B 7/54
2019/0211521 A1 * 7/2019 Waters, Jr. .............. E02B 3/102
2024/0026732 A1 * 1/2024 Mitchell ............... E06B 7/2305

* cited by examiner

*Primary Examiner* — Brian E Glessner
*Assistant Examiner* — Adam G Barlow
(74) *Attorney, Agent, or Firm* — The Concept Law Group, PA; Scott D. Smiley; Scott M. Garrett

(57) ABSTRACT

A flood panel barrier system uses a series of water-impermeable panels around a structure or across openings in the structure where could otherwise enter the structure. The panels are supported at their interfaces by vertical support members that are rigidly mounted to ground surface. The vertical support members do not require bracing that extends behind the barrier in many applications and held in place at their lower end by opposing angled plates. There are fastening units for fastening the panels to the vertical support members, as well as fastening various supporting plates to the ground surface, and each of the fastening units include a knob that allows for tightening or loosening of the fastening unit, as needed.

15 Claims, 18 Drawing Sheets

SUPPORT STRUCTURE FOR FLOOD BARRIER PANELS

FIELD OF THE INVENTION

The present invention relates generally to flood barriers, and, more particularly, relates to a support structure for supporting flood panels that form a flood barrier and prevent water intrusion.

BACKGROUND OF THE INVENTION

Water intrusion into buildings and structures due to flooding is responsible for a large amount of property damage. Flooding occurs as a result of rain, snow melt, and storm surge along coastlines, among other causes. As a result, flooding can occur in many different places in both rural and urban locations. In general, barriers have proven to be very effective at protecting property from flooding. There are numerous kinds of barriers, from sand bag barriers to earthen dykes with mechanically stabilized soil, and in many places panel systems are used. A panel system is a series of water-impermeable panels that are mounted to, or adjacent to a building or structure, and to the ground surface around the building or structure, in a substantially water tight arrangement. These barrier systems typically require angled braces for structural support on the back side (facing the building or structure being protected) to ensure the panels are not pushed inward and defeated by the water pressure during a flood event. This results in a minimum distance being necessary between the back of the panel barrier and the structure in order to fit the braces in between the panels and the building or structure. Also, the panels are typically connected using bolts and nuts, which are time-intensive to assemble and disassemble. As a result, when an event arises that may produce flooding, there is a limited time to set up barriers, and often limited space in which they can be set up.

Therefore, a need exists to overcome the problems with the prior art as discussed above.

SUMMARY OF THE INVENTION

In accordance with some embodiments, there is provided a support system for a flood panel barrier that includes a vertical support member that has a front wall, and has a central wall that extends from a back side of the front wall at substantially a right angle to the front wall and from a center, in a horizontal direction, of the front wall. The barrier further includes a first angled plate and a second angled plate that are both disposed at a bottom of the vertical support member. The first angled plate and the second angled plate are on opposite sides of the central wall of the vertical support member, and each of the first and second angled plates have a vertical portion and a horizontal portion. The vertical portion being planar and oriented parallel to and against the central wall with an edge of the vertical portion being against the back side of the front wall of the vertical support member. The horizontal portion extends from a bottom of the vertical portion and is configured to be parallel to a ground surface. A planar horizontal gasket is disposed under the horizontal portion of the first angled plate and another such gasket is disposed under the horizontal portion of the second angled plate, or one horizontal gasket can extend under both angled plates. The barrier further includes a first fastening unit that passes through the horizontal portion of the first angled plate into an anchor in the ground surface and which exerts a pressure against a top surface of the horizontal portion of the first angled plate. There is also a second fastening unit that passes through the horizontal portion of the second angled plate into an anchor in the ground surface and which exerts a pressure against a top surface of the horizontal portion of the second angled plate.

In accordance with another feature, the vertical support member has a "T" shaped horizontal cross-section. In accordance with another feature, the vertical support member has an "I" or an "H" shaped horizontal cross-section.

In accordance with another feature, each of the first and second fastening units includes a tap bolt that passes through the horizontal portion of a respective one of the respective first and second angled plates, an anchor embedded in a bore into which a distal end of the tap bolt is threaded, a washer disposed on a top side of the horizontal portion of the respective one of the respective first and second angled plates, and an adjustment knob threaded onto the bolt above the respective washer.

In accordance with another feature, the vertical portion of each of the first and second angled plates is not fastened to the vertical support member.

In accordance with another feature, there is further included at least one panel and a panel gasket disposed between the at least one panel and a front side of the front wall of the vertical support member. There is also included a plurality of panel fastening units arranged in a vertical series that fasten the panel to the front wall of the vertical support member and compress the panel gasket between the panel and the front wall of the vertical support member.

In accordance with some embodiments, there is provided a flood panel barrier system that includes at least two flood panels arranged in a series and defining at least one edge to edge interface between the at least two flood panels where an edge of one flood panel meets an edge of an adjacent flood panel. There is also at least one vertical support member. Each vertical support member is positioned at one of the edge-to-edge interfaces of the panels. Each one of the vertical support members has a central wall that extends from a back side of a front wall at substantially a right angle to the front wall and from a center, in a horizontal direction, of the front wall. Each vertical support member is fixed by two opposing angled plates at a bottom of the vertical support member. There is also, adjacent each edge of the interfacing flood panels, a plurality of panel fastening units arranged in a vertical series that fasten the respective flood panels to the front wall of the respective vertical support member to compress a panel gasket between the flood panel and the front wall of the vertical support member. There is also included an elongated angled plate disposed along a bottom of the flood panels at a front side of the flood panels. The elongated angled plate has a vertical portion positioned against the front side of the flood panels, and a horizontal portion that is positioned over a ground surface, with a front ground gasket between the horizontal portion and the ground surface. The vertical portion is fastened to the flood panels by a plurality of fastening units, and the horizontal portion is fastened to the ground surface by a plurality of fastening units.

In accordance with another feature, the opposing angled plates comprise a first angled plate and a second angled plate disposed at the bottom of each of the at least one vertical support member, with the first angled plate and the second angled plate being on opposite sides of the central wall of the at least one vertical support member. Each of the first and second angled plates have a vertical portion and a horizontal portion. The vertical portion is planar and oriented parallel to, and against, the central wall, with an edge of the vertical portion being against the back side of the front wall of the vertical support member. The horizontal portion extends from a bottom of the vertical portion and is configured to be parallel to the ground surface. A planar horizontal gasket is disposed under the horizontal portion of the first angled plate and under the horizontal portion of the second angled plate.

In accordance with another feature, the vertical support member has a "T" shaped horizontal cross-section.

In accordance with another feature, the vertical support member has an "I" or an "H" shaped horizontal cross-section.

In accordance with another feature, the at least two flood panels define outer edges of the series of at least two panels, there is a side extension at each of the outer edges that join the outer edge to a vertical surface of a structure.

In accordance with another feature, each of the panel fastening units includes a tap bolt that passes through the respective one of the at least two flood panels, panel gasket, and front wall of the at least one vertical support member. The panel fastening units further include a rivet nut disposed at a back side of the front wall of the vertical support member into which the tap bolt is threaded. The panel fastening units each also include a washer disposed at a front side of the respective flood panel of the at least two flood panels, and an adjustment knob threaded onto the tap bolt between the respective washer and a head of the tap bolt.

In accordance with another feature, each one of the plurality of fastening units in the vertical portion of the elongated angled plate include a tap bolt that passes through the respective one of the at least two flood panels, panel gasket, and front wall of the at least one vertical support member; a rivet nut disposed at a back side of the front wall of the vertical support member into which the tap bolt is threaded; a washer disposed at a front side of the respective flood panel of the at least two flood panels; and an adjustment knob threaded onto the tap bolt between the respective washer and a head of the tap bolt. Each of the plurality of fastening units in the horizontal portion of the elongated angled plate include a tap bolt that passes through the horizontal portion the ground gasket, and into a bore in the ground surface; an anchor embedded in the bore into which a distal end of the tap bolt is threaded; a washer disposed on a top side of the horizontal portion; and an adjustment knob threaded onto the bolt above the respective washer.

In accordance with another feature, there is further includes a support bar having an upper end that is connected to the vertical support member. There is also included a support bracket that is anchored to the ground surface behind the vertical support member. A point where the support bar is connected to the vertical support member is at a height of two thirds of a height of the vertical support member from the ground surface.

In accordance with another feature, the support bar is linear and is at a forty-five-degree angle between the support bracket and the point where the support bar is connected to the at least one vertical support member.

Although the invention is illustrated and described herein as embodied in a support structure for a flood panel barrier system, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

"In the description of the embodiments of the present invention, unless otherwise specified, azimuth or positional relationships indicated by terms such as "up", "down", "left", "right", "inside", "outside", "front", "back", "head", "tail" and so on, are azimuth or positional relationships based on the drawings, which are only to facilitate description of the embodiments of the present invention and simplify the description, but not to indicate or imply that the devices or components must have a specific azimuth, or be constructed or operated in the specific azimuth, which thus cannot be understood as a limitation to the embodiments of the present invention. Furthermore, terms such as "first", "second", "third" and so on are only used for descriptive purposes, and cannot be construed as indicating or implying relative importance.

In the description of the embodiments of the present invention, it should be noted that, unless otherwise clearly defined and limited, terms such as "installed", "coupled", "connected" should be broadly interpreted, for example, it may be fixedly connected, or may be detachably connected, or integrally connected; it may be mechanically connected, or may be electrically connected; it may be directly connected, or may be indirectly connected via an intermediate medium. As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the article being referenced. Those skilled in the art can understand the specific meanings of the above-mentioned terms in the embodiments of the present invention according to the specific circumstances.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present. Terms of approximation, such as, for example, "substantially," "about," and "approximately" should be understood to mean a tolerance of +/−5%, unless otherwise specified, or if the specific parameter being described necessarily requires a wider and narrower tolerance.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

Figure 1:
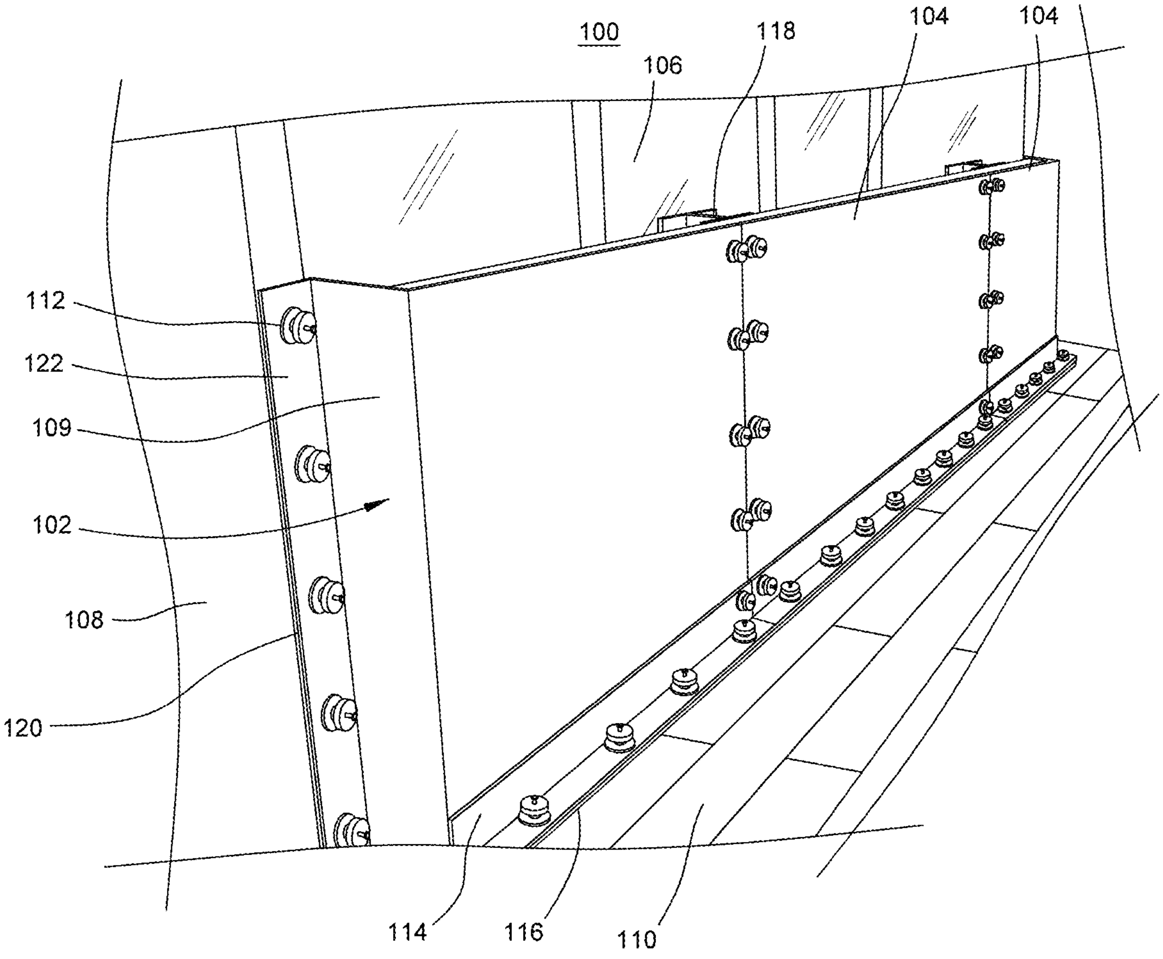
FIG. 1 shows front perspective view of a flood panel barrier system having a support structure in accordance with some embodiments.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

FIG. 1 shows front perspective view of a flood panel barrier system 100 having a support structure in accordance with some embodiments. A flood panel is a discrete section of a barrier that is connected to adjacent panels in a series around a structure, or across an opening or openings in the structure through which water could enter the structure, such as doors, for example. Each of the panels is also connected to a hardened and generally level ground surface, such as concrete, and which also acts as a water barrier. At the ends of the barrier system, the end panels can be connected vertically to a wall or other portion of the structure being protected, or the panels can be arranged in a ring around the structure without being connected to the structure. All of these connections are substantially water tight, and prevent water on the outside of the barrier from passing to the inside of the barrier system, where the structure being protected is located.

Figure 2:
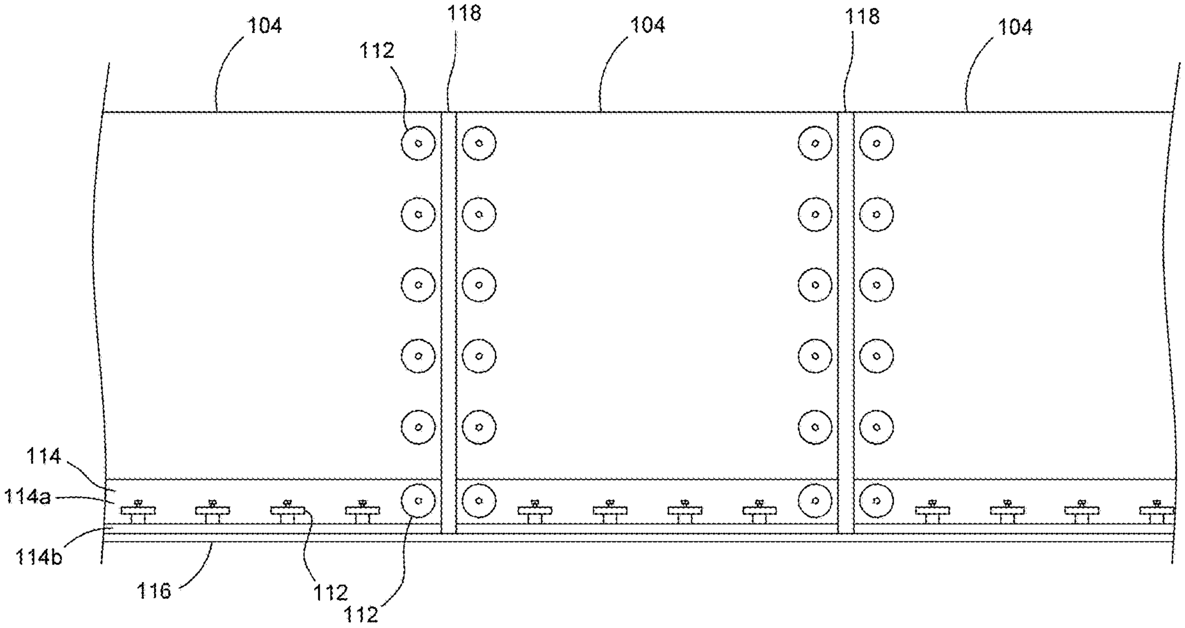
FIG. 2 shows a front elevational view of a section of a flood panel barrier system having a support structure in accordance with some embodiments.

In addition to FIG. 1, FIG. 2 shows a front elevational view of a section of a flood panel barrier system, and reference to both of these drawings should be made in the following discussion. A series 102 of panels 104 are connected together across an opening in the structure 108 behind the panels 104. In this case, the opening is window system 106 that extends to the ground 110, which is a bricked surface here. Each of the panels are rigid members that have a water-impermeable construction, and are configured to withstand the pressure of water against them at one side, and not buckle or otherwise substantially deform. The panel 104 at the end, our outer edge of the series 102 of panels, where the wall 108 is located, includes a side extension 109 that is connected to a flange 122 in a water tight manner. The flange 122 is parallel to the front surface of the building 108, or a sufficient portion thereof, and pressed against the building, with a gasket member 120 between the flange 122 and the building. The gasket member 120 is compliant and compressible and forms a substantially water tight seal between the flange 122 and the building 108.

Likewise, across the bottom of the panels 104, at their front side, is an angled plate 114 that is a rigid elongated angled plate having one portion (114*b*) configured to interface with the ground surface 110, and another portion (114*a*) at a right angle that is configured to interface with one or more of the panels 104. A front ground gasket 116 sits under the angled plate 114 and extends under the panels 104 as well. Fastening units 112 are provide along the length of the angled plate 114 in both portions 114*a*, 114*b*. The fastening units 112 in portion 114*b* fasten the panel system to anchors in the ground, while the fastening units 112 in portion 114*a* join the angled plate 114 to the panels 104, and to other portions of the system 100. Each fastening unit 112 includes a bolt member that extends through an opening in the angled plate 114. Along portion 114*a* the bolt passes through the panels 104 as well, and into a rivet nut on the other side of the panel 114. Along portion 114*b* the bolts pass through the gasket 116 and into an anchor that is embedded in the ground surface 110. More detail of the fastening units will be discussed in regard to FIG. 3. The fasting units bear against the top side or surface of portion 114*b* and front side of portion 114*a*.

In the series 102 of panels 104, the panels 104 are joined to vertical support member 118 at the edges of the panels 104. For the sake of terminology herein, a "side" of a panel 104 refers to one of the two major surfaces, i.e. the front side and the back side. The front side faces outward from the building and the back side faces toward the building, although the panels 104 can be reversible so the front and back sides aren't defined until the panels are installed in the series 102. The panels also have edges where the sides end. The edges also define surfaces of the panels, but these surfaces are very small (in area) compared to the front and back side surfaces.

As show herein FIGS. 1 and 2, the panels are rectangular, and have two opposing vertical edges, a top edge along the top of the panel, and a bottom edge along the bottom of the panel. The bottom edge of each panel 104 rests on the bottom gasket 116. Since the panels 104 are rectangular, and homogenous in construction, their orientation may be dictated by the row of openings adjacent opposite vertical edges; the top edge is therefore whichever edge is oriented to the top of the panel 104 when the panel is installed, and likewise, the bottom edge is defined at installation. Fastening units 112 along the bottom portion 114*b* of the angled plate 114 compress the panels against the gasket 116 to form a substantially water tight seal along the bottom edge of each of the panels 104. The vertical support member 118 sits immediately behind, and in contact with the back sides of the panels 104 adjacent a vertical edge to connect the panels 104 together via the vertical support members 118. Several fastening units 112 are coupled through the panels and to the vertical support members 118. The vertical support members 118 are also fastened to the ground surface 110, as will be explained in more detail herein. The panels 104, being arrange in a series 102, define edge to edge interfaces where the vertical edge of one flood panel is adjacent to the vertical edge of another flood panel. The vertical support members 118 are positioned at these edge-to-edge interfaces.

Figure 3:
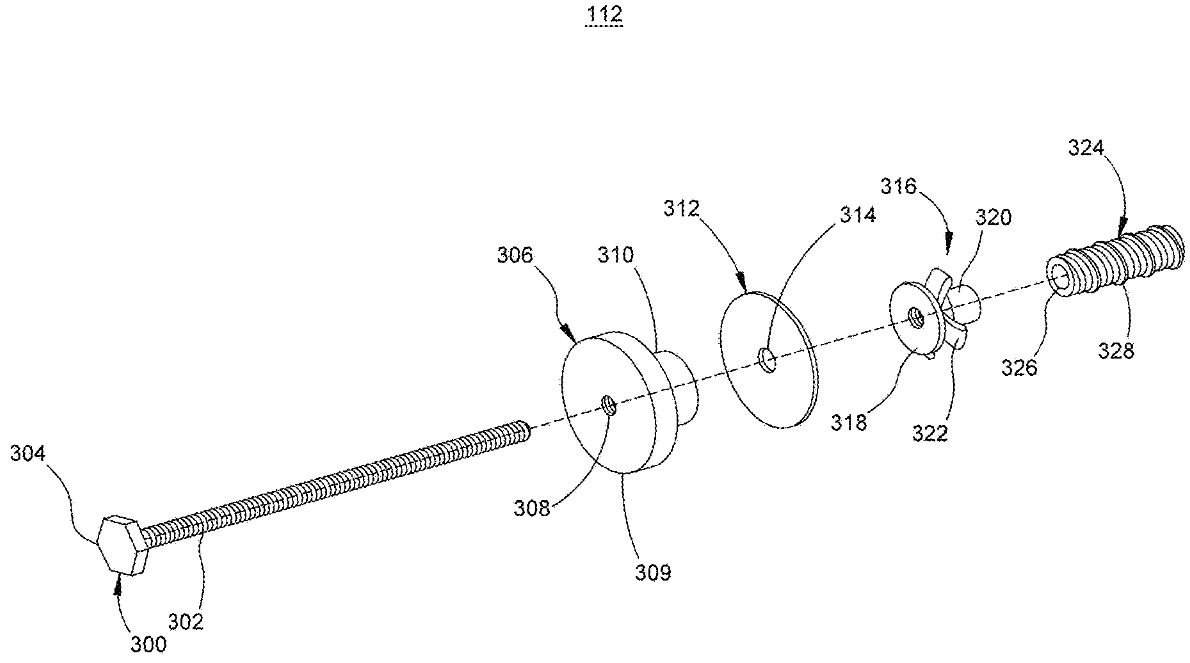
FIG. 3 shows an exploded view of a fastener unit for use with the inventive flood panel barrier system support structure, in accordance with some embodiments.

FIG. 3 shows an exploded view of a fastener unit 112 for use with the inventive flood panel barrier system support structure, in accordance with some embodiments. The fastener unit 112 include a bolt 300 which can be a tap bolt. The bolt 300 includes a threaded shank 302 and a head 304 that can be a hex-head, as is well known. An adjustment knob 306 has a threaded through-hole 308 to allow the adjustment knob 306 to thread onto the shank 302 of the tap bolt 300. The main body 309 is puck-shaped and can be knurled or fluted around the outside edge to allow for turning the knob 306. The knob 306 further includes a standoff 310 that can also be puck-shaped, with have smaller diameter than the main body 309, and through which the threaded hole 308 also passes. The bottom of the standoff portion 310 of the knob 306 bears against a washer 312 to exert a compressive force, which has an opening 314 that is slightly larger than the outside diameter of the shank 302 of the bolt. Thus, the shank 302 can pass through the washer 312 without having to be threaded through the washer 312. The washer 312 can be a dock washer and have a diameter of about three inches in some embodiments. The bolt 300 can have a length of four to six inches, such as a ⅜"×4" tap bolt. The knob 306 and washer 312 are positioned on the outward facing side of the panels so that personnel can easily access and tighten or loosen the knobs 306 of each fastener unit 112. The bolt shank 302 passes through the angled plate 114, and/or a panel, or the vertical support member 118, depending on where it is located. The distal end of the shank 302 threads into either a rivet nut 316 or an anchor 324, depending on the location of the fastening unit 112. The rivet nut 316 includes a threaded body 320 into which the shank 302 is threaded. A flange 318 extends outward and acts like a washer. There is a collapsible portion 322 that collapses when the bolt is tightened while the flange 318 is bearing against a surface, causing sections of the collapsible portion to collapse and extend outward. The anchor 324 can be a snake anchor and is intended to fit into a bore, such as a bore into the ground surface 110, and frictionally engage the sides of the bore so as to become stuck fast in the bore. This can occur, for example, by making the inner diameter of the axial bore 326 slightly smaller than the outside diameter of the shank 302 of the bolt 300, and the outside diameter of the body 328 of the anchor about the same as the diameter of the bore into which the anchor 324 is sunk. Thus, when the bolt 300 is threaded into the axial bore 326, it will force the body 328 outward against the wall of the bore in which the anchor 324 is sunk. Fastening units that secure the panels to the vertical support members of the vertical portion of angled plates can be referred to as panel fastening units and use the rivet nut 316. Fastening unit that secure the horizontal portion of angled plates to the ground can be referred to a ground or plate fastening units and use an anchor 324.

Figure 4:
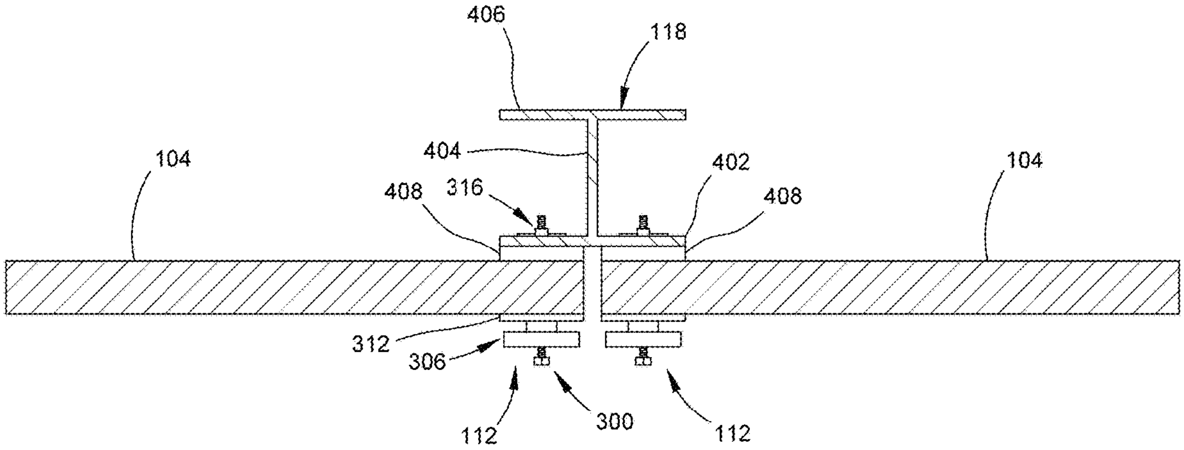
FIG. 4 shows a top plan view of flood panel barrier system where two panels meet, and the inventive support structure used to hold the panels in place, in accordance with some embodiments.
Figure 5:
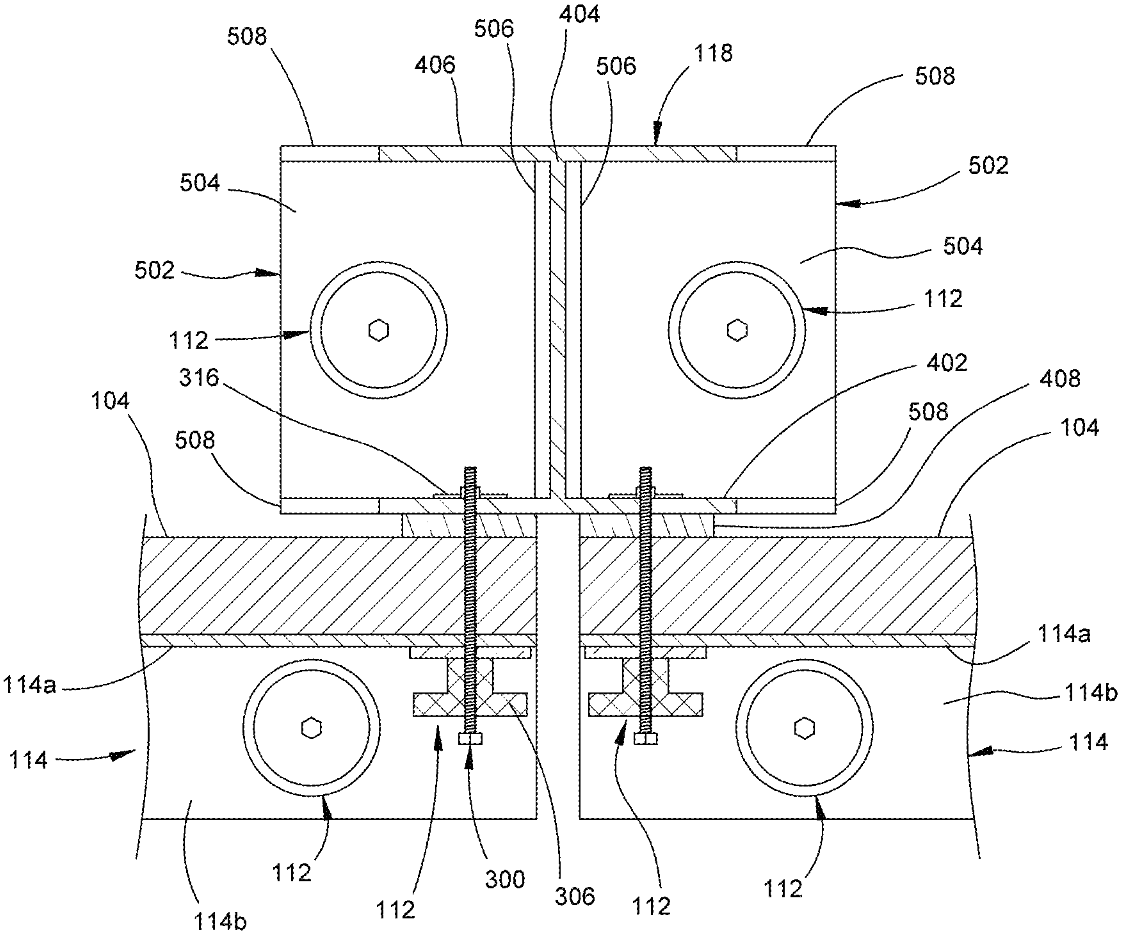
FIG. 5 shows a top plan view detail of a flood panel barrier system where two panels meet, in accordance with some embodiments.
Figure 6:
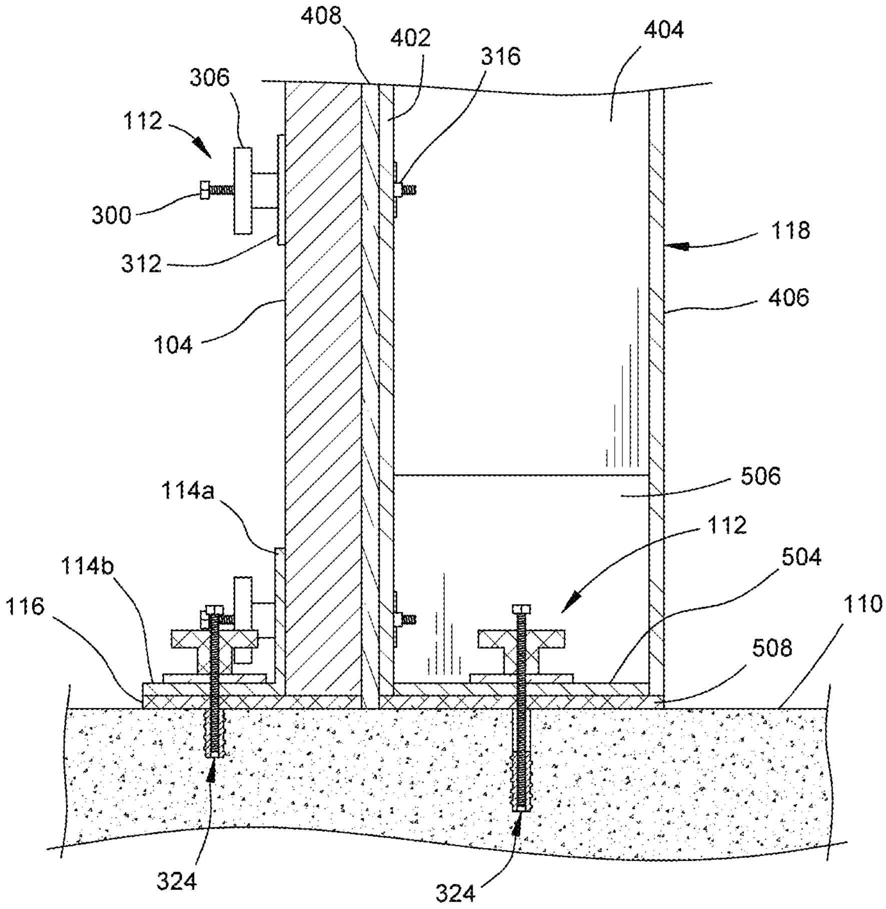
FIG. 6 shows a side sectional view with the section being taken vertically through the middle of a panel, of a flood panel barrier system, in accordance with some embodiments.
Figure 7:
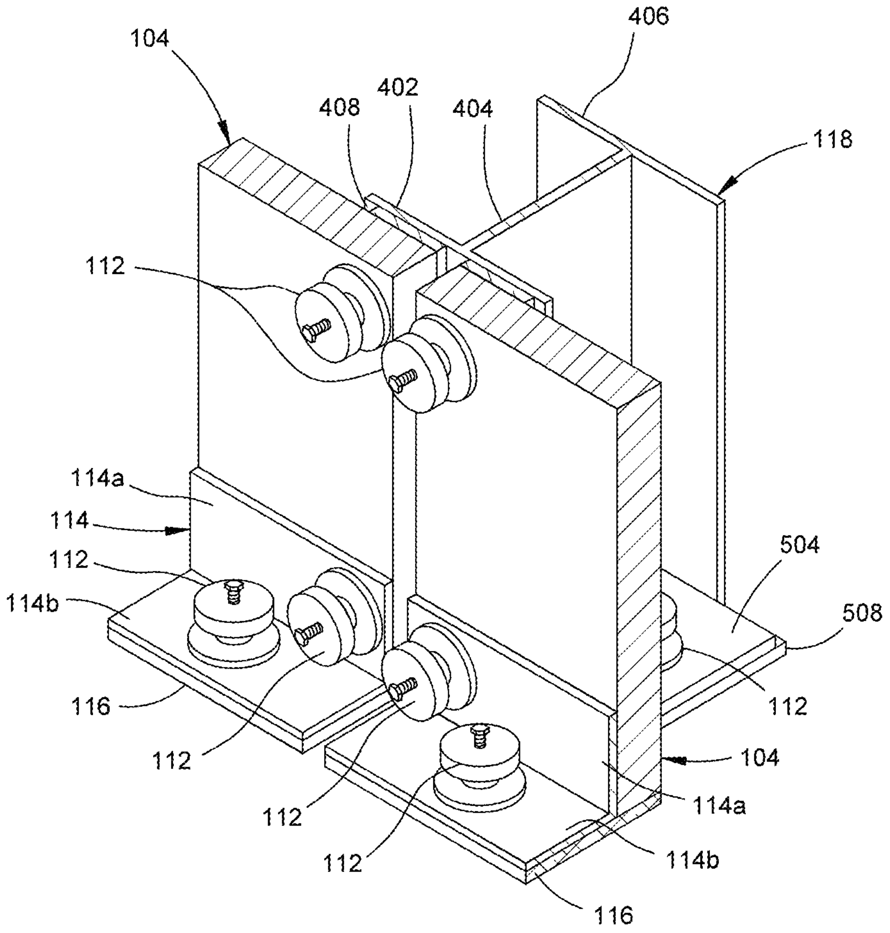
FIG. 7 shows a detail perspective view of the lower power of a flood panel barrier system where two panels meet, in accordance with some embodiments.

FIG. 4 shows a top plan view of flood panel barrier system where two panels 104 meet, and the inventive support structure used to hold the panels in place, in accordance with some embodiments. Reference should be made to FIGS. 5-7 here as well as they show the vertical support member 118 coupled to the ground surface in a top plan view, side elevational view, and perspective view, respectively.

A vertical support member 118 is a vertically elongated "I" or "H" beam that extends substantially from the ground surface upwards. In most cases the beam will extend to the top edge of the panels 104. The vertical support member 118 has a horizontal cross section in the shape of an "I" or "H" configuration, and includes front wall 402 that engages the back sides of the panels 104. From the front wall 402 there is a central wall 404 extending from the center of the front wall 402 at a right angle to the back wall 406. The "I"/"H" configured vertical support member 118 is one example of a possible configuration of a vertical support member in general.

A series of fastening units 112 are placed along the side of the panels 104 in a vertical series. Each one of the fastening units includes a bolt that passes through the panel 104 and the front wall 402 of the vertical support member 118, and are anchored to a rivet nut 316. Between the front wall 402 of the vertical support member 118 and the back side of the panel 104 there is a panel gasket 408. The gasket 408 is elongated in the vertical direction, and planar between the panels and the front wall 402 of the vertical support member 118, and extend from the ground surface, or from the horizontal gasket 116.

In FIGS. 5-7 it can be seen that there are angled plates 502 fitted into the bottom of the vertical support member 118 on each side of the opposing sides of the central wall 404, and between the front wall 402 and the back wall 406, and against the central wall 404. This arrangement "sandwiches" the bottom of the vertical support member between the opposing angled plates 502. The angled plates 502 have a horizontal portion 504 that interfaces with the ground surface 110 and sits on a planar horizontal gasket 508. The angled plates also have a vertical portion 506 that is against (in contact with) the central wall 404 of the vertical support member 118. Both the horizontal and vertical portions 504, 506 are as wide as the space between the front wall 402 and the back wall 406 of the vertical support member. Thus, the angled plates 502 fit tightly into the vertical support member 118. A fastening unit 112 is placed on each angle plate 502 at the horizontal portion 504, and the bolt 300 of each of those fastening units passes through the horizontal portion 504, the gasket 508, and into an anchor 324 that is sunk into the ground surface 110. The angled plates 502 when arranged and anchored to the ground surface as shown, hold the vertical support member 118 upright, and resist movement of the vertical support member 118 due to the vertical portions 506 bearing against the walls 402, 404, 406 of the vertical support member 118. This arrangement eliminates the need for an angled support behind the vertical support member. Meaning, a beam or post extending from the back wall of the vertical support member 118 to the ground surface at a distance away from the vertical support member, is not needed in at least some applications. An angled support member can still be used in some application, however. It will be appreciated that FIG. 7 is a sectional view, where a portion of the barrier system to the left and right of the vertical support member 118 have been removed to show the angled plate 502 at the bottom of the vertical support member 118. Further, a portion of the barrier system above a vertical plane section has been removed so that components of the connecting members can be more easily seen in detail.

Figure 8:
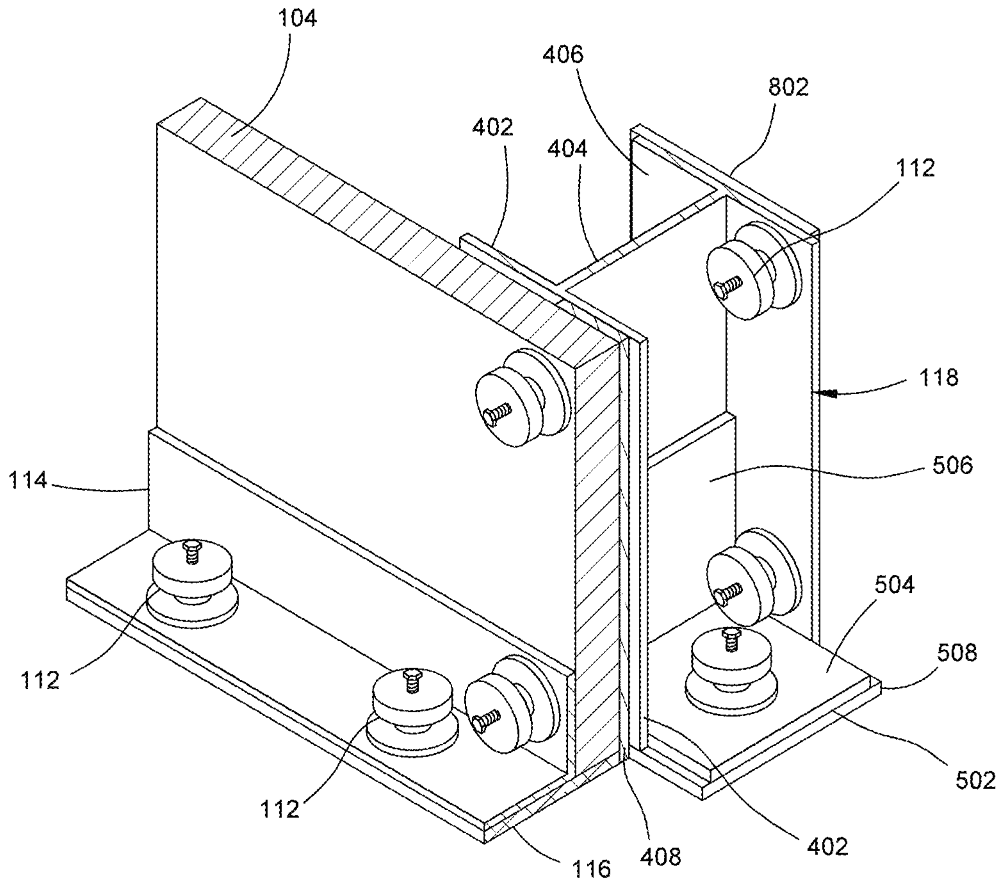
FIG. 8 shows a detail perspective view of the lower portion of a flood panel barrier system and an of the barrier, in accordance with some embodiment.

FIG. 8 shows a detail perspective view of the lower portion of a flood panel barrier system and an end of the barrier, in accordance with some embodiments. In this example a vertical support member 118 is used at the end of a flood panel barrier system to connect to a vertical wall of a structure in a water ingress resistant manner. As with FIG. 7, the portion shown here in FIG. 8 is a section view with substantial portions of the barrier system removed from the view to better show the details being described here. The arrangement here is similar to that of FIG. 7, where there are angle plates 502 on each side of the bottom of the vertical support member to hold the bottom of the vertical support member 118 in place and to help it resist movement. However, the back wall 406 of the vertical support member is interfaced to a vertical surface of the structure through a gasket 802. The surface can be, for example, the outside wall of the structure. Fastening units 112 anchor the back wall 406 of the vertical support member to the structure. In addition, only one panel 104 is attached to the front wall 402 of the vertical support member 118.

Figure 9A:
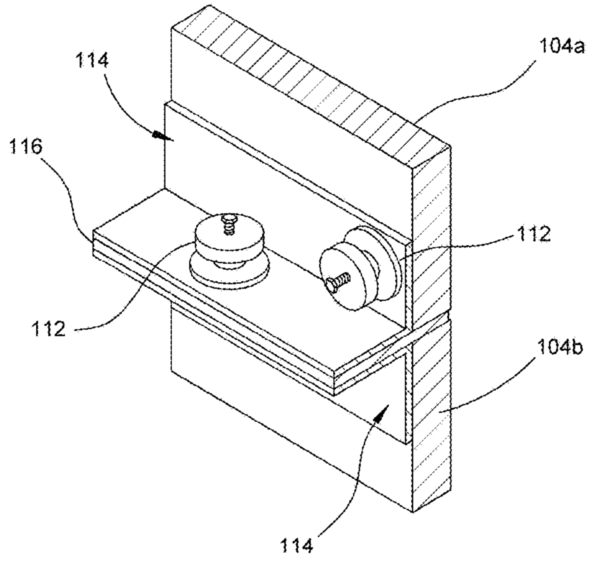
FIGS. 9A and 9B show detail perspective view of vertically joining panels in a flood panel barrier system, in accordance with some embodiments.
Figure 9B:
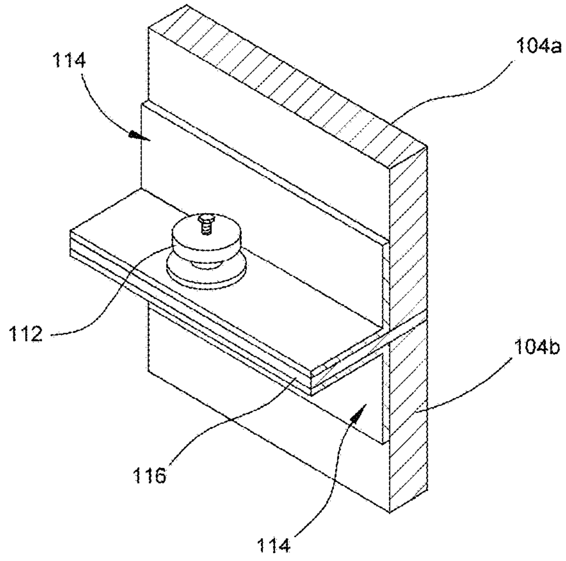

FIGS. 9A and 9B show detail perspective view of vertically joining panels 104*a*, 104*b* in a flood panel barrier system, in accordance with some embodiments. Although a single panel 104 can be as much as four feet high, a higher barrier may be desired or needed in some applications. In each drawing there is a lower panel 104*b* and an upper panel 104*a*. Opposing angled plates 114 can be used to interface these panels 104*a*, 104*b* in a vertical manner. An upper angled plate is positioned at the bottom of the upper panel 104*a*, and an inverted angled plate 114 is positioned at the top of the lower panel 114*b*. A gasket 116 sits between the horizontal portions of the angled plates 114 and the panels 104*a*, 104*b*. Fastener units 112 are used to fasten the horizontal portions of the angle plates together (to each other) and the vertical portions of the angled plates 114 to the respective panels 104*a*, 104*b*. As in FIG. 1, the angled plates 114 extend across the entirety of the panels 104 in the horizontal direction.

Figure 10:
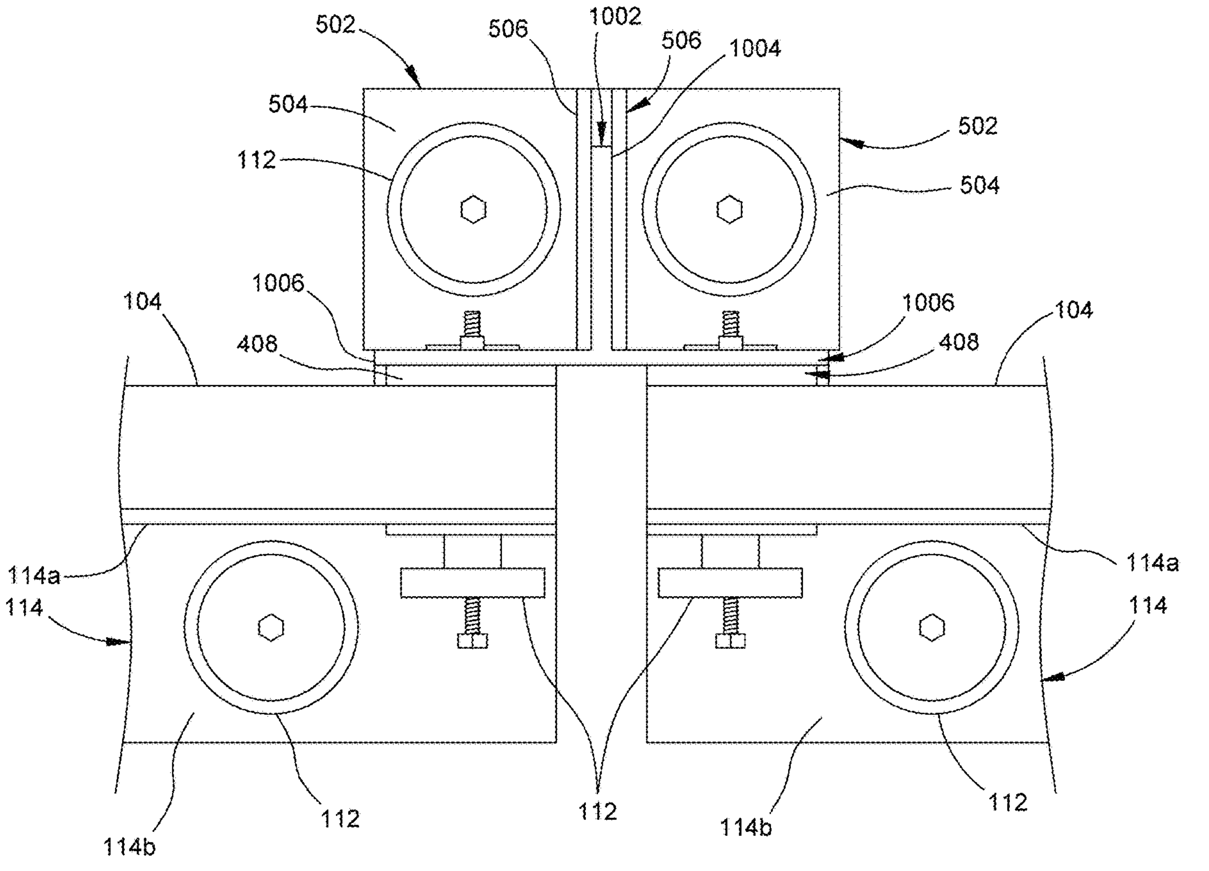
FIG. 10 shows a top plan view detail of a flood panel barrier system where two panels meet, in accordance with some embodiments.
Figure 11:
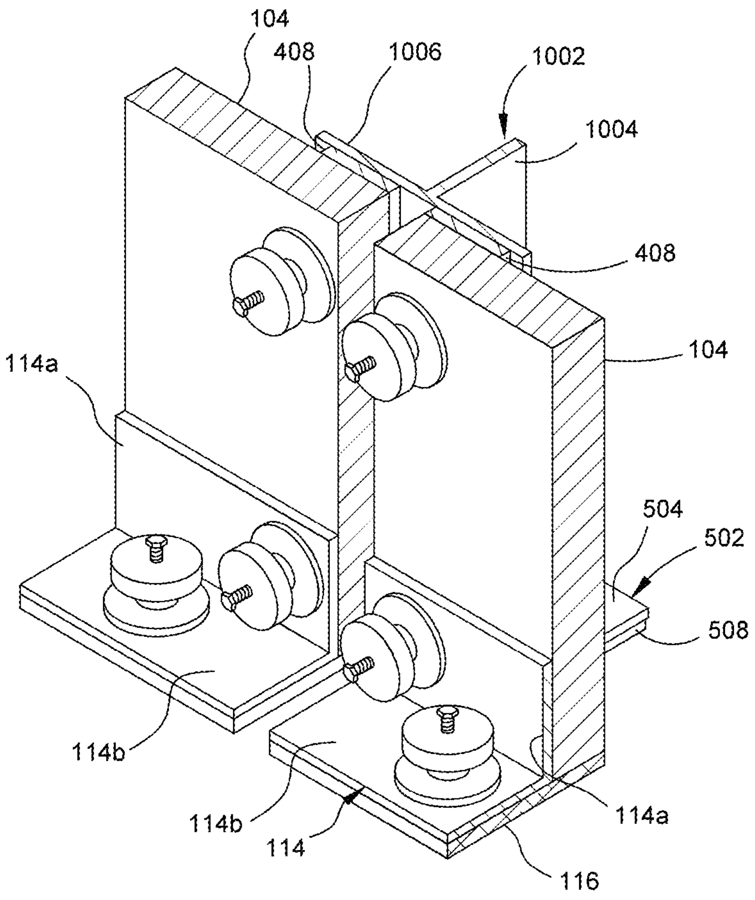
FIG. 11 shows a detail perspective view of the lower power of a flood panel barrier system where two panels meet, in accordance with some embodiments.

FIG. 10 shows a top plan view detail of a flood panel barrier system where two panels meet, in accordance with some embodiments. FIG. 11 shows the same section, from a perspective view, with the side and upper sections of the panels removed. The embodiment illustrated here is substantially similar to the embodiment of FIGS. 4-7, with the difference being that the vertical support member 1002 is "T" shaped instead of "I" or "H" shaped in its horizontal cross section. That is, the vertical support member 1002 has a front wall 1006 and a central wall 1004 that extend from the front wall 1006 at a right angle, and is centrally located along the width of the front wall 1006 in the horizontal direction. The same angled plated 114 are used at the front bottom of the panels 104, the same gaskets 408 can be used between the panels 104 and the front wall 1006 of the vertical support member 1002, the same angled plates 502 can be used at the bottom of the vertical support member 1002 to bear against the front and central walls 1006, 1004, and the same fasting units 112 are provided in the same locations, generally. When the water level at the front of the panels 104 rises, the pressure at the bottom of the panels is greatest, and pushing in a direction from the front to the back. This tends to counteract the force of the water against the vertical support member 1002 through the barrier system, because of the vertical portions 506 of the angled plates 502 bearing against the back side of the front wall 1006 of the vertical support member 1002 resists any tendency of the vertical support member 1002 to lean to the back.

Figure 12A:
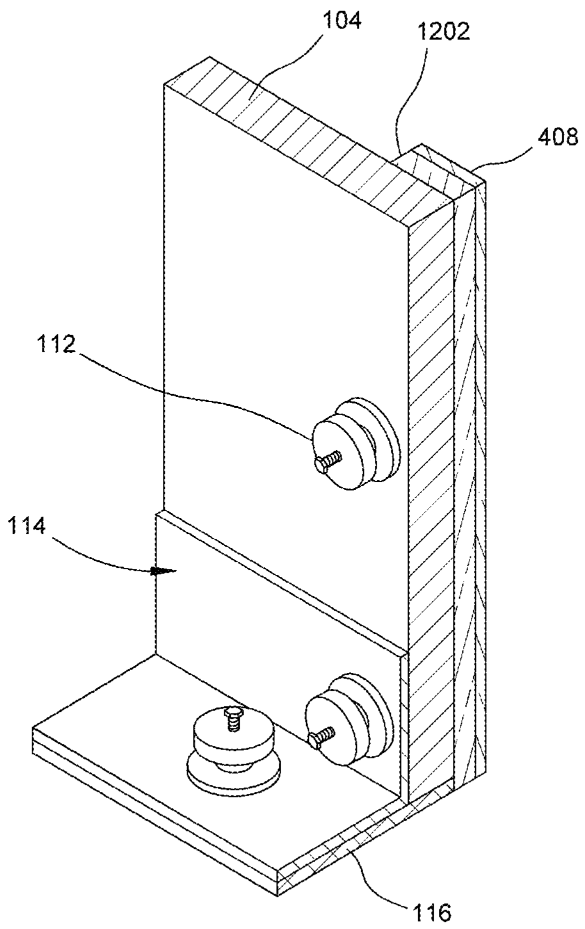
FIGS. 12A and 12B show detail perspective view of end panels of a flood panel barrier system and different wall connections, in accordance with some embodiments.
Figure 12B:
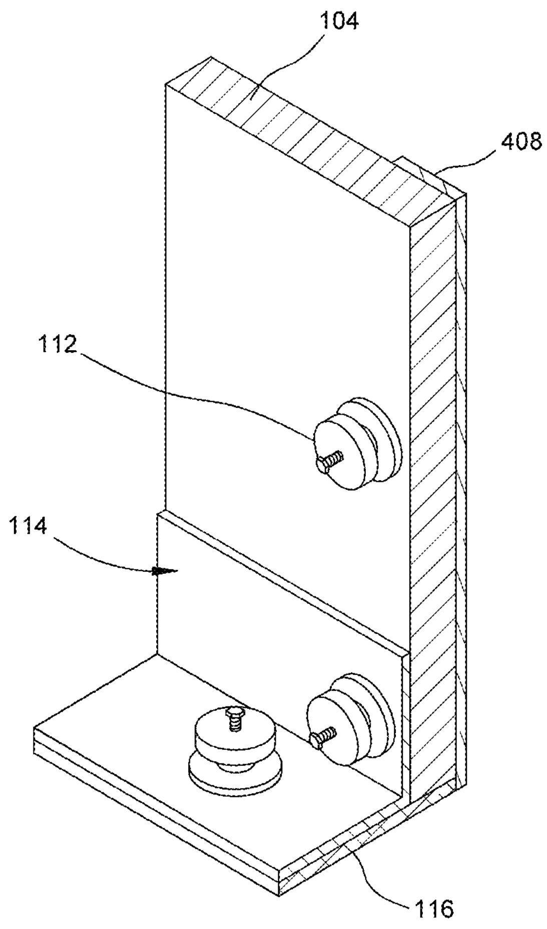

FIGS. 12A and 12B show detail perspective view of end panels of a flood panel barrier system and different wall connections, in accordance with some embodiments. These details are similar to that of FIG. 8, but do not use a vertical support member to connect to the wall of the structure. Rather, the fastening units 112 on the vertical side of the panel 104 use anchors that are embedded in the wall of the structure. In FIG. 12A there is a spacer 1202 between the panel 104 and the gasket 408, and in FIG. 12B the spacer 1202 is not used. These simply show another way that the barrier system can be terminated at one end of the barrier system.

Figure 13:
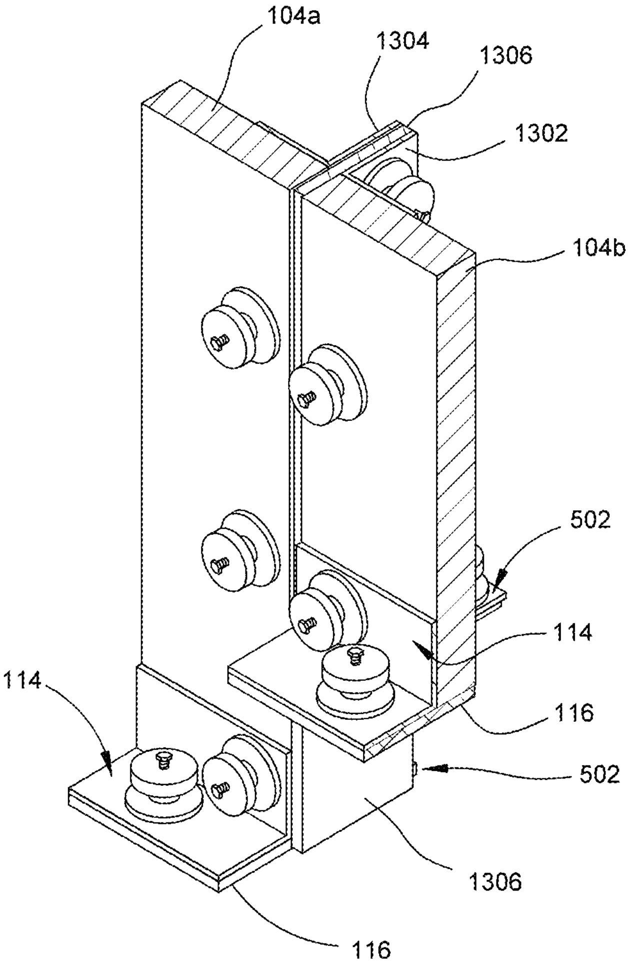
FIG. 13 shows a detail perspective view of a section of a flood panel barrier system configured for a stair step, in accordance with some embodiments.

FIG. 13 shows a detail perspective view of a section of a flood panel barrier system configured for a stair step, or similar change in elevation of the ground surface, in accordance with some embodiments. This also shows a third alternative of a vertical support member, which here is created by using two angled plates 1302, 1304 with a gasket 1306 between them. The angled plates 1302, 1304 can be substantially the same as angled plates 114, but are oriented vertically in their elongated direction. The two angled plates 1302, 1304 act substantially like a "T" shaped vertical support member as in FIGS. 10-11. However, this arrangement allows the angled plates 502 at the bottom of the vertically oriented angled plates 1302, 1304 to be at the different elevations, just as the angled plates 114 are at different elevations on each side of the gasket 1306.

Figure 14:
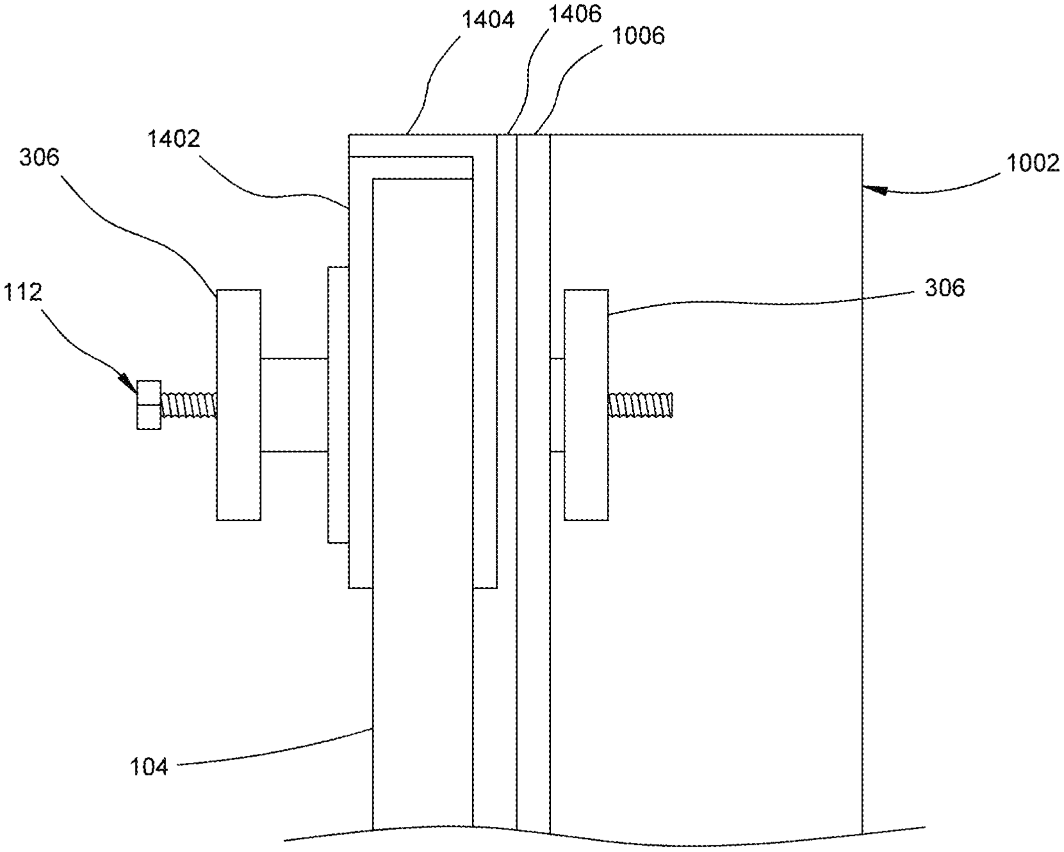
FIG. 14 shows a side sectional view of a flood panel barrier system taken vertically through a panel section in which there is a cap system placed over the top of the panel(s), in accordance with some embodiments.
Figure 15:
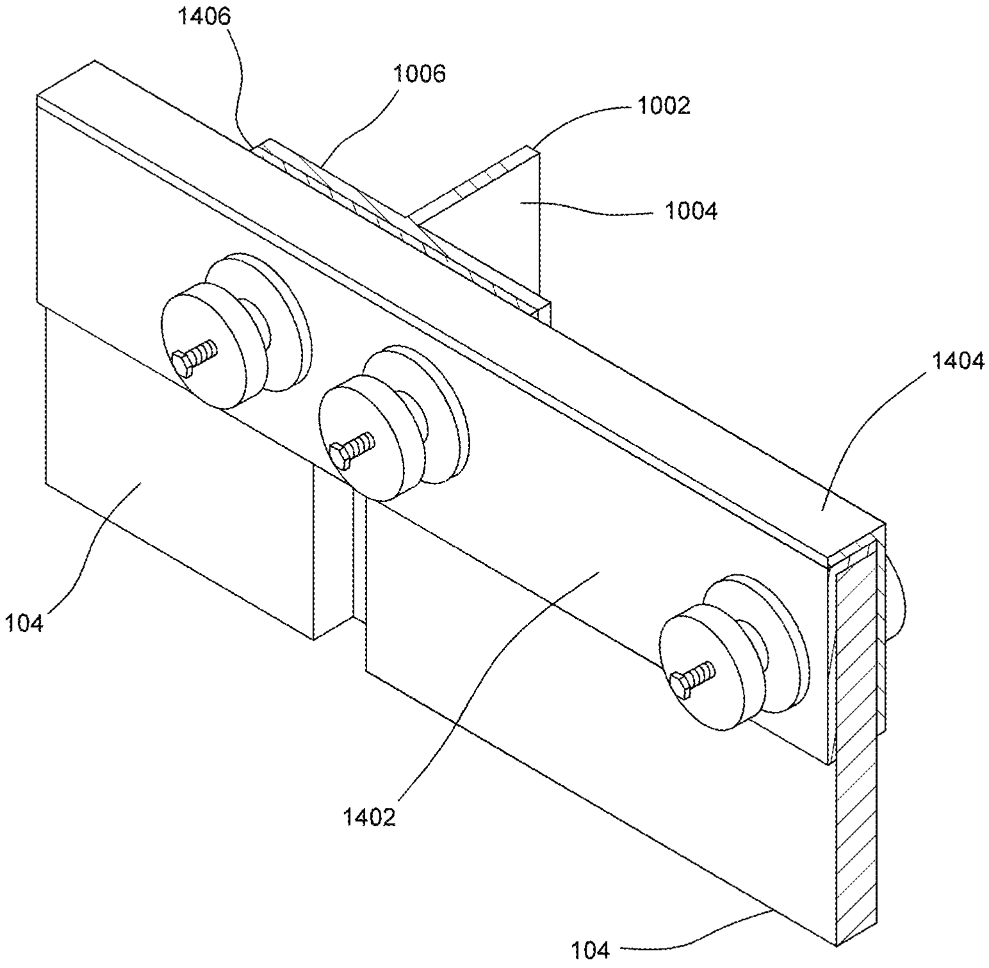
FIG. 15 shows a front detail perspective view of a portion of a flood panel barrier system having a cap system, in accordance with some embodiments.

FIG. 14 shows a side sectional view of a flood panel barrier system taken vertically through a panel section in which there is a cap system placed over the top of the panel(s), in accordance with some embodiments. FIG. 15 shows a front detail perspective view of a portion of a flood panel barrier system having a cap system. In this embodiment a cap is placed over the top of the panel to help increase its rigidity and prevent any tendency of the panel to bow outward from pressure created by water on the outside of the panel during a flood event. FIG. 14 shows the top edge of a panel 104, which has a first cap member 1402 across the front of the panel 104 along the top edge, with an overlapping portion over the top edge. Likewise, cap member 1404 runs along the back side of the panel 104 along the top edge, and has a portion that overlaps along the top of the panels 104. In fact the cap members 1402, 1404 can breach the separation between the panels. The fastening units 112 can use knobs 306 on both sides of the panels to counter tighten against the cap member 1402, 1404.

Figure 16:
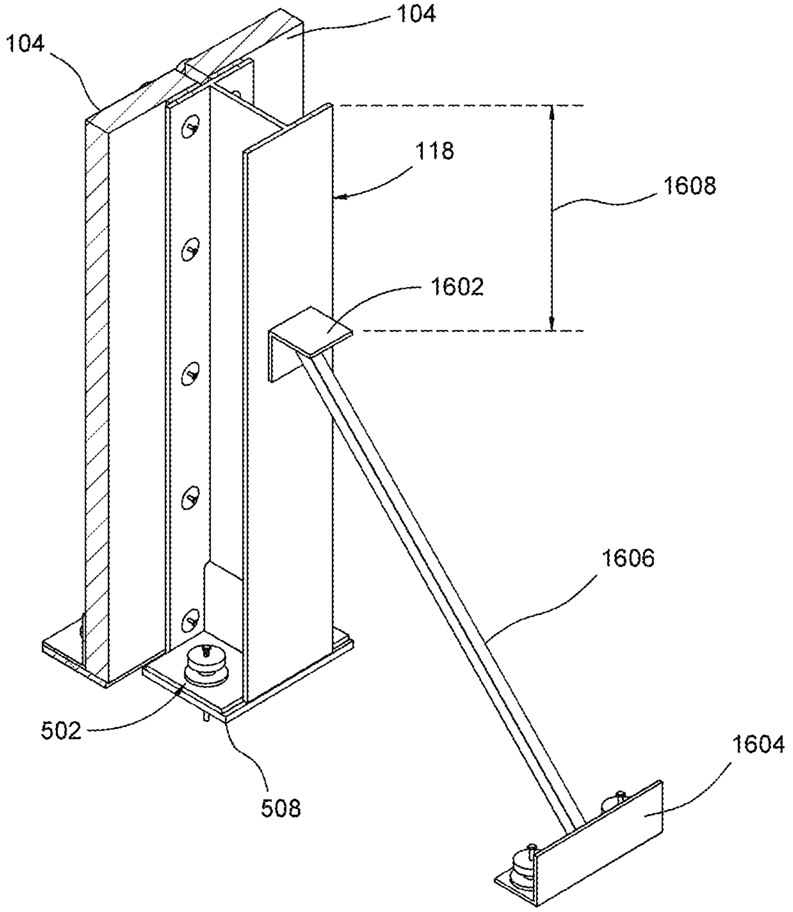
FIG. 16 shows a rear perspective view of a flood panel barrier system including a support brace, in accordance with some embodiments.
Figure 17:
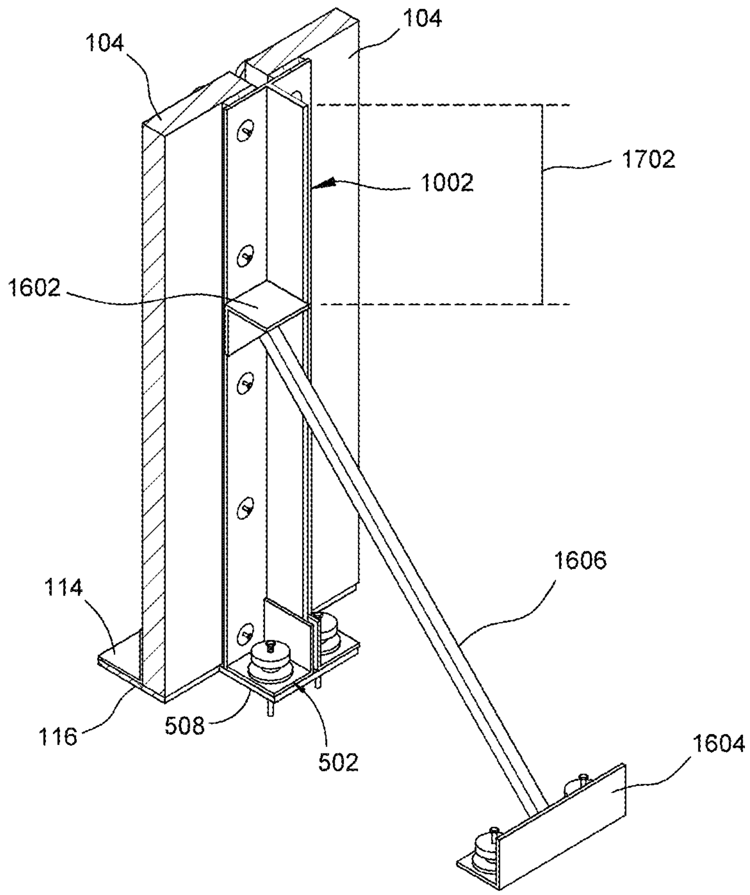
FIG. 17 shows a rear perspective view of a flood panel barrier system including a support brace, in accordance with some embodiments.
Figure 18:
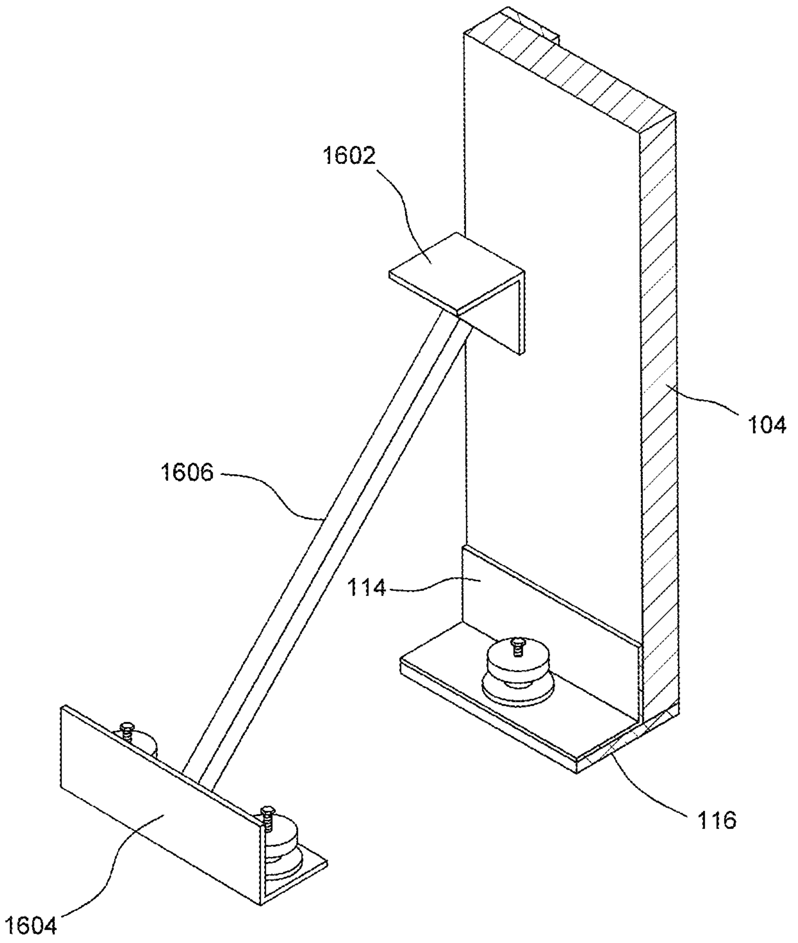
FIG. 18 shows a front perspective view of a flood panel barrier system including a support brace, in accordance with some embodiments.

FIG. 16 shows a rear perspective view of a flood panel barrier system including a support brace, in accordance with some embodiments. In this embodiment the "I" or "H" vertical support member 118 is used, as in FIGS. 4-8. In some cases, where space allows behind the barrier, and angled support may be desirable to resist excessive forces against the barrier. For example, in flooding event caused by heavy rains, generally only water pressure will bear against the panels 104. However, in situations such as storm surge, then there can be a current that increases the pressure against the panels, and the current may carry object/debris that can impact against the panels. Thus, in addition to the support provided at the bottom of the vertical support member 118 by the angled plates 502, an angled support bar 1606 may be used to further support and stabilize the vertical support member against unexpected forces incident on the barrier system. The support bar 1606 is coupled between an upper bracket 1602 located at a point on the back wall 406 of the vertical support member that is about a distance 1608 equal to one third of the height of the panel 104 from the top of the panel (or ⅔rds from the bottom/ground surface). A support bracket 1604 is anchored to the ground surface at the lower end of the support bar 1606. The upper bracket can be attached by adhesive or other mounting means, or it can be integrally formed on the vertical support member 118. The angle of the support bar can be about forty five degrees in some embodiments. FIG. 17 shows a rear perspective view of a flood panel barrier system including a support brace, in accordance with some embodiments where the "T" shaped vertical support member 1002 is used. The only difference from the embodiment of FIG. 16 is that the upper bracket 1602 is attached to the back side of the front wall 1004 of the vertical support member 1002. The distance 1702 is equal to the distance 1602. FIG. 18 shows a front perspective view of a flood panel barrier system including a support brace, in accordance with some embodiments. In this case the upper bracket 1602 is attached to the front side of the panel 104, and the lower bracket 1604 is located in front of the barrier system, meaning it will be in the water if there is a flood event. Preferably the upper bracket 1602 will be opposing a similar bracket 1602 on the other side of the barrier, but that is not necessary for the front-mounted support bar to be effective.

The disclosed embodiments provide a flood panel barrier system and novel support structures that reduce the spacing necessary to deploy the flood panel barrier system. By using lightweight, rigid vertical support members that can be fixed in place using opposing angled plates that both anchor to the ground and interfere with movement of the vertical support member, the use of bracing arms is not necessary in most applications. The disclosed fastening units allow for rapid deployment of the disclosed flood panel barrier system because they do not require a wrench to tighten/loosen due to the provision of a puck-shaped knob on the tap bolt shank. Overall, these features provide a flood panel barrier system that is easier and faster to deploy and take down, and which requires less space than conventional barrier systems.

The claims appended hereto are meant to cover all modifications and changes within the scope and spirit of the present invention.

What is claimed is:

1. A support system for a flood panel barrier, comprising:

a vertical support member having a front wall, and having a central wall that extends from a back side of the front wall at substantially a right angle to the front wall and from a center, in a horizontal direction, of the front wall;

a first angled plate and a second angled plate disposed at a bottom of the vertical support member, with the first angled plate and the second angled plate being on opposite sides of the central wall of the vertical support member, each of the first and second angled plates having a vertical portion and a horizontal portion, the vertical portion being planar and oriented parallel to and against the central wall with an edge of the vertical portion being against the back side of the front wall of the vertical support member, the horizontal portion extending from a bottom of the vertical portion and configure to be parallel to a ground surface, a planar horizontal gasket disposed under the horizontal portion of the first angled plate and under the horizontal portion of the second angled plate; and a first fastening unit that passes through the horizontal portion of the first angled plate into an anchor in the ground surface and which exerts a pressure against a top surface of the horizontal portion of the first angled plate, a second fastening unit that passes through the horizontal portion of the second angled plate into an anchor in the ground surface and which exerts a pressure against a top surface of the horizontal portion of the second angled plate.

2. The support system as claimed in claim 1, wherein the vertical support member has a "T" shaped horizontal cross-section.

3. The support system as claimed in claim 1, wherein the vertical support member has an "I" or an "H" shaped horizontal cross-section.

4. The support system as claimed in claim 1, wherein each of the first and second fastening units includes a tap bolt that passes through the horizontal portion of a respective one of the respective first and second angled plates, an anchor embedded in a bore into which a distal end of the tap bolt is threaded, a washer disposed on a top side of the horizontal portion of the respective one of the respective first and second angled plates, and an adjustment knob threaded onto the bolt above the respective washer.

5. The support system as claimed in claim 1, wherein the vertical portion of each of the first and second angled plates is not fastened to the vertical support member.

6. The support system as claimed in claim 1, further comprising:
- at least one panel;
- a panel gasket disposed between the at least one panel and a front side of the front wall of the vertical support member; and
- a plurality of panel fastening units arranged in a vertical series that fasten the at least one panel to the front wall of the vertical support member and compress the panel gasket between the at least one panel and the front wall of the vertical support member.

7. A flood panel barrier system, comprising:
- at least two flood panels arranged in a series and defining at least one edge to edge interface between the at least two flood panels where an edge of one flood panel meets an edge of an adjacent flood panel;
- at least one vertical support member, where one of the at least one vertical support member is positioned at each at least one edge to edge interface, each one of the at least one vertical support member having a central wall that extends from a back side of a front wall at substantially a right angle to the front wall and from a center, in a horizontal direction, of the front wall, wherein each vertical support member of the at least one vertical support member is fixed by two opposing angled plates at a bottom of the vertical support member;
- adjacent each edge of the one flood panel and the adjacent flood panel and each edge to edge interface there are a plurality of panel fastening units arranged in a vertical series that fasten the respective one of the one flood panel and the adjacent flood panel the front wall of the respective on of the at least one vertical support member and compress a panel gasket between the one flood panel and the front wall of the vertical support member, and between the adjacent flood panel and the front wall of the vertical support member; and
- an elongated angled plate disposed along a bottom of the at least two flood panels at a front side of the at least two flood panels, the elongated angled plate having a vertical portion positioned against the front side of the at least two flood panels, and a horizontal portion that is positioned over a ground surface, with a front ground gasket between the horizontal portion and the ground surface, and wherein the vertical portion is fastened to the at least two flood panels by a plurality of fastening units, and the horizontal portion is fastened to the ground surface by a plurality of fastening units.

8. The flood panel barrier system as claimed in claim 7, wherein the opposing angled plates comprise a first angled plate and a second angled plate disposed at the bottom of each of the at least one vertical support member, with the first angled plate and the second angled plate being on opposite sides of the central wall of the at least one vertical support member, each of the first and second angled plates having a vertical portion and a horizontal portion, the vertical portion being planar and oriented parallel to and against the central wall with an edge of the vertical portion being against the back side of the front wall of the at least one vertical support member, the horizontal portion extending from a bottom of the vertical portion and configure to be parallel to the ground surface, a planar horizontal gasket disposed under the horizontal portion of the first angled plate and under the horizontal portion of the second angled plate.

9. The flood panel barrier system as claimed in claim 7, wherein the vertical support member has a "T" shaped horizontal cross-section.

10. The flood panel barrier system as claimed in claim 7, wherein the vertical support member has an "I" or an "H" shaped horizontal cross-section.

11. The flood panel barrier system as claimed in claim 7, wherein the at least two flood panels define outer edges of the series of at least two panels, there is a side extension at each of the outer edges that join the outer edge to a vertical surface of a structure.

12. The flood panel barrier system as claimed in claim 7, wherein each of the panel fastening units comprises:
- a tap bolt that passes through the respective one of the at least two flood panels, panel gasket, and front wall of the at least one vertical support member;
- a rivet nut disposed at a back side of the front wall of the vertical support member into which the tap bolt is threaded;
- a washer disposed at a front side of the respective flood panel of the at least two flood panels; and
- an adjustment knob threaded onto the tap bolt between the respective washer and a head of the tap bolt.

13. The flood panel barrier system as claimed in claim 7, wherein each one of the plurality of fastening units in the vertical portion of the elongated angled plate include:
- a tap bolt that passes through the respective one of the at least two flood panels, panel gasket, and front wall of the at least one vertical support member;
- a rivet nut disposed at a back side of the front wall of the vertical support member into which the tap bolt is threaded;
- a washer disposed at a front side of the respective flood panel of the at least two flood panels; and
- an adjustment knob threaded onto the tap bolt between the respective washer and a head of the tap bolt;
- and wherein each of the plurality of fastening units in the horizontal portion of the elongated angled plate include:
  - includes a tap bolt that passes through the horizontal portion the ground gasket, and into a bore in the ground surface;
  - an anchor embedded in the bore into which a distal end of the tap bolt is threaded,
  - a washer disposed on a top side of the horizontal portion; and
  - an adjustment knob threaded onto the bolt above the respective washer.

14. The flood panel barrier system as claimed in claim 7, further comprising:
- a support bar having an upper end that is connected to the at least one vertical support member;
- a support bracket that is anchored to the ground surface behind the vertical support member; and
- wherein a point where the support bar is connected to the at least one vertical support member is at a height of two thirds of a height of the at least one vertical support member from the ground surface.

15. The flood panel barrier system as claimed in claim 14, wherein the support bar is linear and is at a forty five degree angle between the support bracket and the point where the support bar is connected to the at least one vertical support member.

* * * * *